(12) United States Patent
Duffield

(10) Patent No.: US 8,358,384 B2
(45) Date of Patent: Jan. 22, 2013

(54) REDUCED RAINBOW ARTIFACTS IN DIGITAL LIGHT PROJECTION SYSTEMS

(75) Inventor: David Jay Duffield, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1285 days.

(21) Appl. No.: 11/793,295

(22) PCT Filed: Jan. 6, 2005

(86) PCT No.: PCT/US2005/000195
§ 371 (c)(1),
(2), (4) Date: Jun. 16, 2007

(87) PCT Pub. No.: WO2006/073397
PCT Pub. Date: Jul. 13, 2006

(65) Prior Publication Data
US 2008/0136978 A1    Jun. 12, 2008

(51) Int. Cl.
H04N 5/64 (2006.01)
G03B 21/14 (2006.01)

(52) U.S. Cl. .......................... 348/771; 353/31

(58) Field of Classification Search ............ 348/771, 348/779, 756, 744, 770, 750; 353/84, 98, 353/31, 121
See application file for complete search history.

(56) References Cited

U.S. PATENT DOCUMENTS

| | | | |
|---|---|---|---|
| 5,592,188 A | 1/1997 | Doherty et al. | |
| 5,706,061 A * | 1/1998 | Marshall et al. | 348/743 |
| 5,909,204 A | 6/1999 | Gale et al. | |
| 5,986,721 A | 11/1999 | Jones, Jr. et al. | |
| 6,147,720 A * | 11/2000 | Guerinot et al. | 348/744 |
| 6,547,399 B2 * | 4/2003 | Knox | 353/31 |
| 6,631,996 B2 | 10/2003 | Moench et al. | |
| 7,118,226 B2 * | 10/2006 | Davis et al. | 353/84 |
| 7,397,517 B2 * | 7/2008 | Ohara et al. | 348/771 |
| 7,483,198 B2 * | 1/2009 | Doan et al. | 359/291 |
| 2002/0122160 A1 | 9/2002 | Kunzman | |
| 2002/0140910 A1 | 10/2002 | Stark et al. | |
| 2004/0160656 A1 | 8/2004 | Hewlett et al. | |

FOREIGN PATENT DOCUMENTS

| | | |
|---|---|---|
| EP | 0 662 773 B1 | 6/1999 |
| EP | 0 748 128 B1 | 12/2001 |
| JP | 10031168 | 2/1998 |
| JP | 11239359 | 8/1999 |
| JP | 2001188196 | 7/2001 |

(Continued)

OTHER PUBLICATIONS

RD0431115, IBM Corp., Mar. 10, 2000.

(Continued)

*Primary Examiner* — Paulos M Natnael
(74) *Attorney, Agent, or Firm* — Robert D. Shedd; Vincent E. Duffy; James McKenzie

(57) ABSTRACT

A projection system can include a color wheel and at least one digital micromirror device. The color wheel can produce different colors of light from a light source. Each color can be produced in sequential order for a predetermined color phase. Each of the digital micromirror device(s) can have a plurality of micromirrors. At least one of the plurality of micromirrors can be activated at different respective portions of each of two consecutive color phases responsive to a control signal. The projection system also can include a lens configured to project light reflected from the at least one digital micromirror device onto a projection surface.

22 Claims, 3 Drawing Sheets

FOREIGN PATENT DOCUMENTS

| | | |
|---|---|---|
| JP | 2002223453 | 8/2002 |
| JP | 2003262824 | 9/2003 |
| JP | 2003307706 | 10/2003 |
| JP | 2003307707 | 10/2003 |
| JP | 2003309782 | 10/2003 |
| JP | 2004511824 | 4/2004 |
| JP | 2004145249 | 5/2004 |
| JP | 2004294985 | 10/2004 |
| WO | WO0149041 | 7/2001 |
| WO | WO02085009 | 10/2002 |

OTHER PUBLICATIONS

International Search Report, dated Sep. 8, 2005.

* cited by examiner

REDUCED RAINBOW ARTIFACTS IN DIGITAL LIGHT PROJECTION SYSTEMS

This application claims the benefit, under 35 U.S.C. §365 of International Application PCT/US2005/000195, filed Jan. 6, 2005 which was published in accordance with PCT Article 21(2) on Jul. 13, 2005 in English.

BACKGROUND

1. Field of the Invention

The present invention generally relates to projection systems and, more particularly, to reducing visual artifacts within such systems.

2. Background of the Invention

Digital Light Processing™ technology refers to the use of an optical integrated circuit that manipulates a light source. The optical semiconductor, referred to as a digital micromirror device (DMD), can be incorporated into a larger projection system. Products incorporating DMD technology are manufactured for a variety of different applications including home and commercial theater use.

A DMD can include a rectangular array of approximately 1.3 million microscopic mirrors called micromirrors. Each micromirror is extremely small, measuring less than approximately one-fifth the width of a human hair. Each micromirror further is mounted on hinges that enable the micromirror to tilt either toward a light source or away from the light source under the control of a driver circuit. When tilted toward the light source, the mirror is said to be in an "on" position since light from the light source is reflected. When tilted away from the light source, the mirror is said to be in an "off" position as no light from the light source is reflected.

A control signal provided to the DMD from the driver circuit directs each micromirror to switch on and off up to several thousand times per second. When a micromirror is switched on more frequently than off, the micromirror reflects a light gray pixel. Conversely, a micromirror that is switched off more frequently than on reflects a darker gray pixel. Thus, when a light source emitting white light is combined with a DMD and a lens, a gray-scale projection system is formed.

Color projection systems can be built by inserting a color wheel in the light path the between the DMD and the light source, or in the light path between the DMD and the projection lens. At the edges of the color wheel are light filters for generating red, green, and blue light. White light emanating from the light source can be passed through these filters as the color wheel rotates. The resulting colored light ultimately enters a projection lens for display on a screen.

The rotation of the color wheel is coordinated with control signals provided to the DMD. Thus, each micromirror can be switched on and off at a particular rate, or for selected time periods, that can vary according to which light filter of the color wheel is being used to filter the light source for a given time period. In other words, the on and off states of each micromirror are coordinated with the rotation of the three colored light filters of the color wheel.

In illustration, a micromirror intended to generate a purple pixel can be turned on to only to cause the reflection of red and blue light. That is, the micromirror can be switched on more often than off when the red and blue filters are used to filter the light. The red and blue reflected light is perceived as a particular shade of purple when shown in rapid succession in the same projection space. In this manner, each micromirror can project what is perceived to be a color pixel of an image. As noted, the switching of the micromirrors, and the proportion of time each micromirror is on or off, is coordinated according to the colored light filter being used to filter the light source. The human visual system integrates the sequential color images and sees a multicolored image.

The color wheel passes only a single color of light through corresponding to the particular one of the filters aligned with the light incident on the wheel. This leads to a situation where images of red, green, and blue are not time coincident upon the projection surface. Small time delays between consecutive colored images can cause noticeable visual artifacts in the resulting image. If the viewer's eye moves too rapidly, the viewer may perceive the individual red, green, and blue images. Such can be the case even when the object is supposed to be white. This can be perceived as a rainbow artifact, meaning that the different colored images are not being perceived as a single, blended image.

It would be beneficial to provide a projection system using DMD technology that reduces perceivable visual artifacts, and particularly rainbow artifacts.

SUMMARY OF THE INVENTION

One aspect of the present invention can include a projection system. The projection system can include means for sequentially producing colored light from a light source. Each colored light can be produced for a predetermined color phase, or time period. One or more digital micromirror devices can be included within the optical path of the colored light producing means and the light source. Each digital micromirror device can include a plurality of micromirrors. At least one of the plurality of micromirrors can be activated responsive to a control signal beginning during a different respective portion within each of two consecutive color phases to cause the reflection of the colored light from the means for sequentially producing colored light. The projection system also can include a lens configured to project colored light reflected from the one or more digital micromirror devices onto a projection surface.

One or more of the plurality of micromirrors can generate at least one complex colored pixel. A complex colored pixel is a pixel having a color generated using more than one color filter from a color wheel. Similarly, a complex picture or image can be a picture or image including a complex color.

In one embodiment, the control signal can activate one or more of the plurality of micromirrors at about a middle or end portion within a first of the two color phases. In another embodiment, the control signal can activate one or more of the plurality of micromirrors at about a beginning or middle portion within a second of the two color phases. Notably, the control signal can cause one or more of the plurality of micromirrors to remain on from a midpoint portion within the first of the two color phases into at least a portion of the second of the two color phases.

The means for sequentially producing colored light can include a color wheel having blue, green, and red light filters. Accordingly, one or more of the plurality of micromirrors can generate one or more complex images from sequentially ordered blue, green, and red images. The color wheel also can include a clear filter for producing white light. White images generated using the clear filter can be generated after blue images and before red images. A white color phase generated using the clear filter can be shorter in time than any other color phase.

Another aspect of the present invention can include a projection system having means for producing blue, green, white, and red light from a light source. Each color can be produced in sequential order for a predetermined color phase.

The projection system also can include at least one digital micromirror device for causing the reflection of the different colors of light and a lens configured to project the different colors of light onto a projection surface. Notably, a color phase for white light can be shorter than color phases for other colors. Further, the color phase for white light can be disposed between color phases for blue and red light.

Another aspect of the present invention can include a method of generating a complex color within a projection system. The method can include (a)

generating different colors of light sequentially, each for a predetermined color phase; and (b) activating at least one micromirror beginning at different respective portions of each of two consecutive color phases. Each color phase can correspond to a different color thereby generating at least a portion of a complex colored picture.

In one embodiment, the step of activating at least one micromirror can include (c) activating, at a midpoint portion of a first of the two consecutive color phases, at least one micromirror to generate at least a portion of an image in a first color. Notably, the midpoint portion can be at least one of the middle or the end of the first color phase. In another embodiment, the activating step can include (d) activating, at approximately a beginning portion of a next color phase for a second color, the at least one micromirror to generate a portion of an image in the second color.

Step (b) can be repeated for different ones of the micromirrors. The method also can include generating a complex image by generating constituent color images ordered as blue, green, and red. A white image can be generated using a clear filter that imparts no specific hue to the light. The white image can be generated between the blue and the red images.

BRIEF DESCRIPTION OF THE DRAWINGS

Preferred embodiments of the present invention will be described below in more detail, with reference to the accompanying drawings.

DETAILED DESCRIPTION

The present invention relates to a projection system and method relating thereto. In accordance with the inventive arrangements, a projection system is disclosed in which visible artifacts, for example rainbow artifacts, can be reduced. Within present day projection systems, multicolored images are generated by displaying constituent colored images in rapid succession. That is, a green image is shown, then a red image, and then a blue image. When shown one after the other in rapid succession, human vision perceives a single multicolored image.

When the amount of time between constituent images is increased, rainbow artifacts are perceived by viewers. The viewer begins to visually discern the individual, or constituent, colored images forming the multicolored images. This can be exacerbated when the viewer momentarily loses focus, for example from the vibrations caused simply by eating or moving one's head.

In accordance with the inventive arrangements disclosed herein, visual artifacts, including rainbow artifacts, can be reduced by displaying the constituent images of a multicolored image in a particular order that is dependent upon the luminosity of each color. Also, the time between the constituent colored images, or portions thereof, forming a multicolor image can be reduced and/or minimized.

Figure 1:
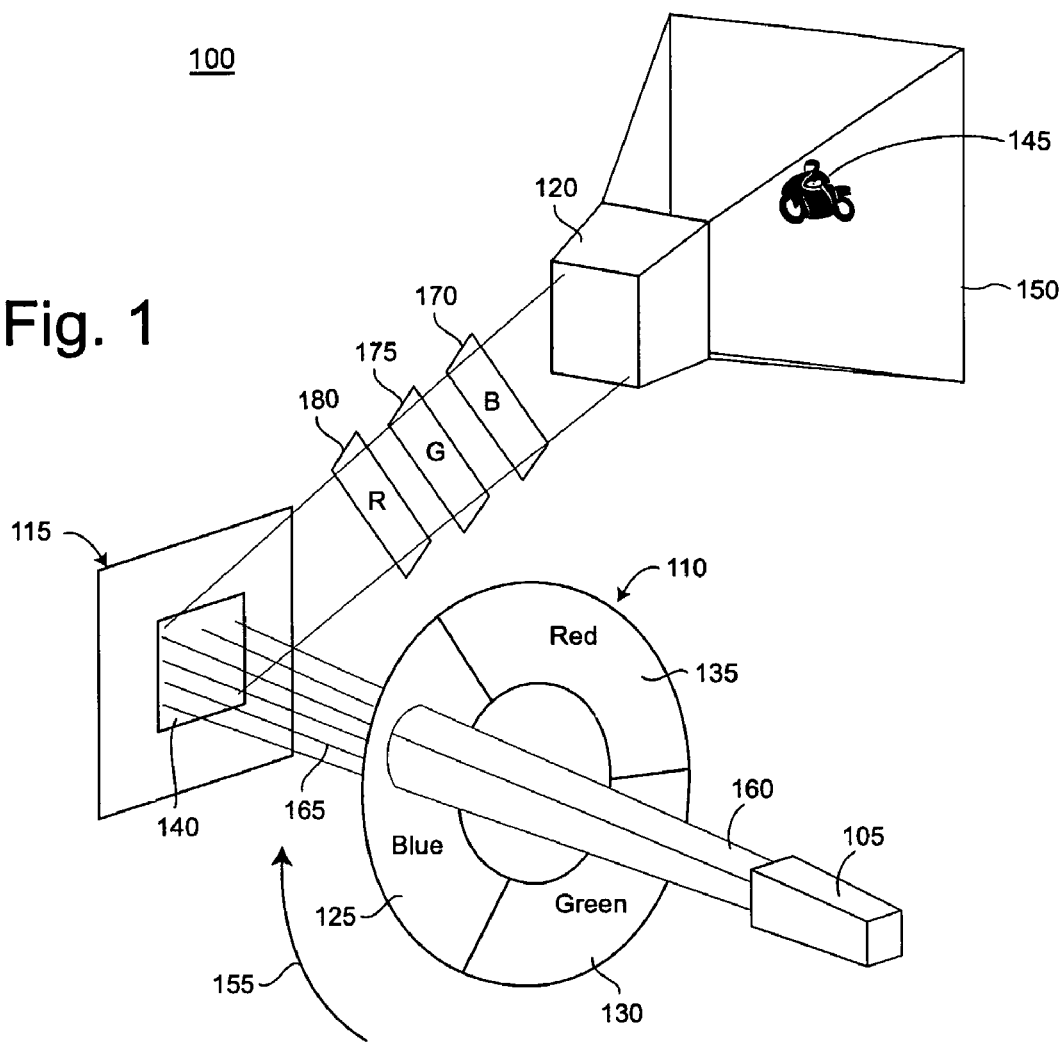
FIG. 1 is a schematic diagram illustrating one embodiment of a projection system in accordance with the inventive arrangements disclosed herein.

FIG. 1 is a schematic diagram illustrating one embodiment of a projection system 100 in accordance with the inventive arrangements disclosed herein. As shown, the system 100 can include a light source 105, a color wheel 110, a digital micromirror device (DMD) 115, and a projection lens 120. The light source 105 can provide a source of white light that can be directed toward the color wheel 110. One or more control processors (not shown) also can be included for generating and providing control signals to the DMD 115 and coordinating rotation of the color wheel 110 with operation of the DMD 115.

According to one embodiment, the color wheel 110 can include three different light filters. The color wheel 110 can include a blue light filter 125, a green light filter 130, and a red light filter 135. The color wheel 110 rotates such that each of the color filters 125-135 is exposed to the light source 105 for a predetermined time period, referred to as a color phase. The color wheel 110, for example, can rotate in a clockwise direction, indicated by arrow 155. Accordingly, the sequence of colored light passed to the DMD 115 is blue, green, and red, which repeats as the color wheel 110 continues to rotate. It should be appreciated, however, that the color wheel 110 can rotate in a counter-clockwise direction. In that case, the color filters 125-135 can be arranged such that the color sequence again is blue, green, red.

Other color sequences also can be used. Referring to the embodiment where blue, green, and red forms the sequence, however, a higher quality picture can be attained. The color green has a higher luminosity than both blue and red. By placing higher luminosity colors, such as green, between lower luminosity colors such as red and blue, visual artifacts can be reduced, thereby leading to a higher quality picture.

While the present invention will be described in large part with reference to a color wheel, it should be appreciated that other mechanisms for generating different colors of light also can be used. Accordingly, the present invention is not to be limited solely to the use of a color wheel. Rather, any mechanism capable of generating sequentially ordered colored light as described herein can be used. Moreover, while the illustrative embodiment depicts the color wheel 110 as lying in the optical path between the light source 105 and the DMD 115, the color wheel could lie in the optical path between the DMD and the projection lens 150.

The DMD 115, as is known, can include a micromirror array 140. The micromirror array can include approximately 1.3 million micromirrors, each being mounted on a hinged mechanism. Each micromirror can be tilted, using the hinged mechanism, toward the light source 105 or away from the light source 105. When tilted toward the light source 105, a micromirror can be said to be in an "on" or "activated" state. When tilted away from the light source 105, a micromirror can be said to be in an "off" or "deactivated" state.

The projector lens 120 can receive light reflected from the micromirror array 140. This light, which forms a series of colored images, results in a perceived multicolored image 145 being projected onto a projection surface 150.

In operation, the color wheel 110 can be made to rotate at some fixed rotational speed such that each colored light filter 125-135 is passed through the beam of light 160 from light source 105 for a predetermined time period, called a color phase. Colored light 165 emerging from the color wheel 110 continues to the micromirror array 140 of the DMD 115.

Control signals are provided to the DMD 115 to control individual micromirrors of the micromirror array 140. The micromirrors can be activated and deactivated during consecutive color phases, where each color phase corresponds to a particular color. That is, during a blue color phase, while blue light is incident upon the micromirror array 140, one or more selected micromirrors can be activated. This results in a blue image 170 being sent to lens 120. During a green color phase, when green light is incident upon the micromirror array 140, another grouping of one or more selected micromirrors can be activated, thereby producing a green image 175. The same can be performed during the color phase in which red light is incident upon the micromirror array 140, thereby producing a red image 180.

During each color phase, each individual micromirror can be activated for an amount of time corresponding to the intensity of the color being reflected within that color phase. As noted, each micromirror can correspond to an individual pixel within color images 170, 175, and/or 180, as well as the resulting image 145. Thus, the blue image 170 can have pixels of differing shades of blue, corresponding to individual micromirrors being activated for varying amounts of time. The green image 175 can have varying shades of green, and the red image 180 can have varying shades of red. The rapid successive display of colored images 170-180 results in a multicolored image 145 being displayed upon the display screen 150.

Conventional display systems operate by activating individual micromirrors of the micromirror display at a beginning of each successive color phase. That is, control signals are synchronized with the rotation of the color wheel 110 such that the DMD 115 begins activating individual micromirrors at the beginning of each color phase. For example, to generate a cyan color formed of blue and green, a blue image would need to be generated followed by a green image. Thus, at the beginning of the blue color phase, conventional projection systems would activate those micromirrors necessary for generating the blue image at the beginning of the blue color phase. Individual micromirrors can be deactivated during the blue color phase according to the intensity of the respective pixel with which each micromirror corresponds.

At the beginning of the green color phase, selected micromirrors needed to generate the green image are activated. Individual micromirrors can be deactivated during the green color phase according to the intensity of the pixel with which each micromirror corresponds. The resulting image is a cyan image having a shade dependent upon the intensity of each respective blue and green image, or portions thereof. The resulting image can be referred to as a complex image in that the image includes colors generated using two or more colored filters of the color wheel 110. Notably, the aforementioned example also is applicable on a pixel level, where a same micromirror is activated at the beginning of successive blue and green color phases. In any case, it should be appreciated that the cycle described herein can be repeated as necessary to produce a series of complex images to render motion.

Figure 2:
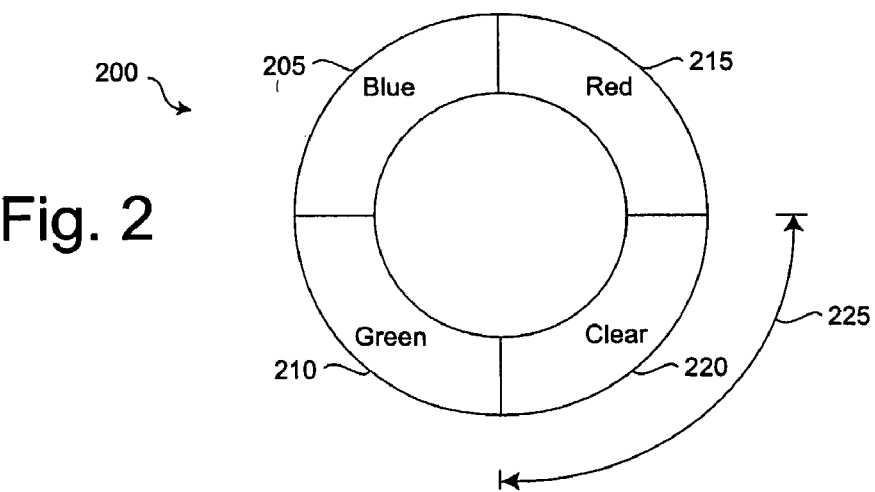
FIG. 2 is a schematic diagram illustrating a color wheel configured according to another embodiment of the present invention.

FIG. 2 is a schematic diagram illustrating a color wheel 200 configured according to another embodiment of the present invention. The color wheel 200 includes four light filters. In addition to a blue light filter 205, a green light filter 210, and a red light filter 215, a clear filter 220 has been included. The clear filter 220 allows the white light of a light source to pass through freely. In one embodiment, the clear filter 220 can be positioned between the green light filter 210 and the red light filter 215 as shown. In another embodiment, however, the clear filter 220 can be positioned between the blue light filter 205 and the green light filter 210.

The introduction of the clear filter 220 reduces the length of the color phases for the other colors. Because of this, the brightness available to project a fully saturated color is reduced slightly. This manifests itself as a loss in brightness available for fully saturated colors. With respect to more common, partially-saturated colors, however, the available brightness can increase as the clear filter 220 projects white light including blue, green, and red light components, rather than just a single color component. In any case, the blue light filter 205, the green light filter 210, and the red light filter 215 can continue to be used to adjust the shading of an image as required and generate any intensity of white that is needed beyond what is provided during the clear filter 220 portion of the wheel.

In FIG. 2, the clear filter 220 is shown to be approximately the same size as the other colored light filters 205-215. In other embodiments, however, the clear filter 220 can be made to be smaller than the other colored light filters 205-215. That is, the portion of the circumference of the color wheel 200 occupied by the clear filter 220, represented by line 225, can be smaller in length than the other colored light filters 205-215. This produces a color phase for white light that is shorter in duration than the color phases for the other colors generated by the color wheel 200.

Figure 3:
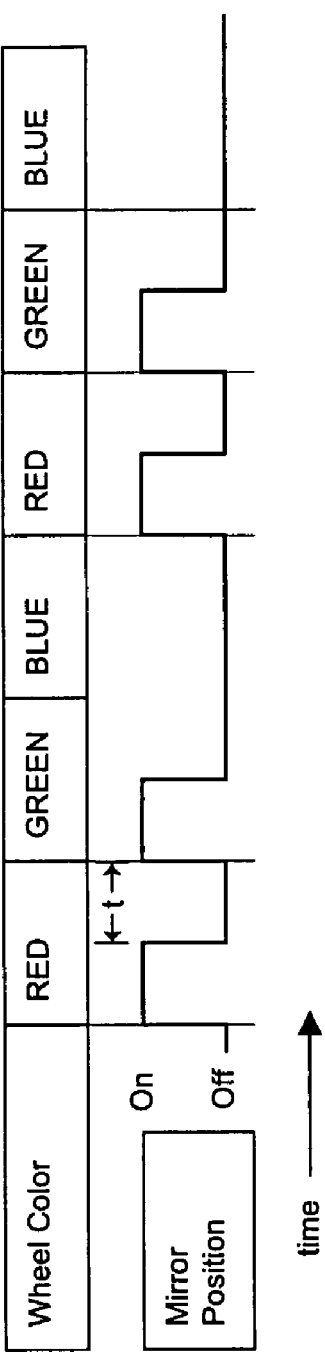
FIG. 3 is a signal flow diagram illustrating a conventional method of generating a complex color within a projection system.

FIG. 3 is a signal flow diagram illustrating a conventional method of generating a complex color. The signal flow diagram illustrates the states of the control signal with respect to a repeating color phase sequence. Thus, the signal flow graph illustrates the activation and deactivation states corresponding to a given micromirror within a micromirror array during consecutive color phases. The color generated in FIG. 3 is a fully-saturated medium yellow comprised of red and green. As shown, the color phase sequence is red, green, and then blue. Traditionally, the micromirror would be activated at the beginning of both the red and green color phases and remain on for some portion, or all, of each color phase. As a result, the time between the generation of the red and green images, in this case single pixels, is maximized as the micromirror is activated at the beginning of the red and green color phases. This results in a time "t" that is large.

Figure 4:
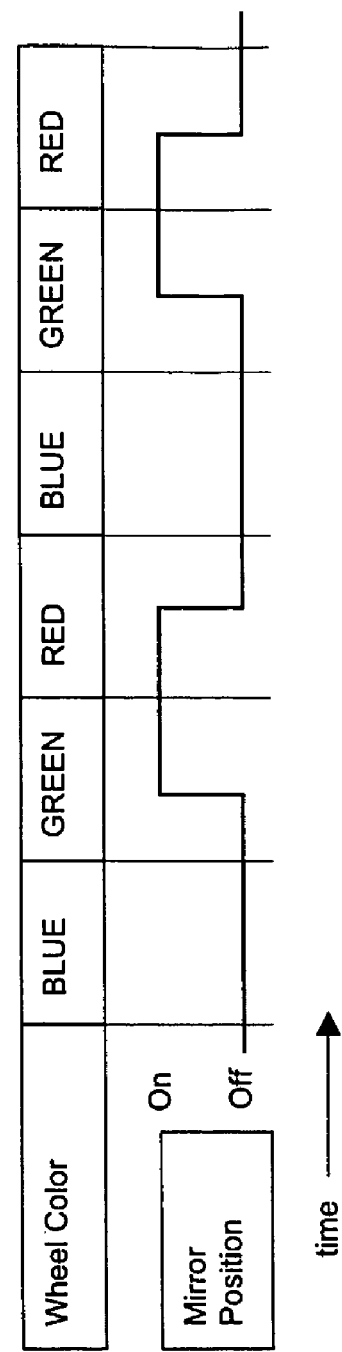
FIG. 4 is a signal flow diagram illustrating a method of generating a complex color in accordance with one embodiment of the present invention.

FIG. 4 is a signal flow diagram illustrating a method of generating a complex color in accordance with one embodiment of the present invention. As shown, the color phase sequence has been changed to blue, green, and then red. Further, the control signal no longer activates micromirrors only at beginning portions of each color phase. Rather, the control signal can activate a micromirror at a beginning or midpoint within a color phase as shown. A midpoint can correspond to any portion of the color phase excluding the beginning. For example, a midpoint can correspond to a portion in a color phase that is at a middle or before the end portion of the color phase.

To generate a fully-saturated medium yellow comprised of green and red, the control signal causes the micromirror to activate during both respective color phases. Notably, however, the micromirror is activated toward the middle or end of the green color phase, i.e. at a midpoint portion. The micromirror is activated, or can remain activated, at the beginning of the red color phase.

Thus, the time between successive activations of the micromirror for the green and red color phases is reduced and/or minimized. This reduces the time between the green and red pixels forming the fully-saturated medium yellow color. When implemented on a larger scale for multiple micromirrors, the time between successive colored images, in this case the green and red images, is reduced and/or minimized. By reducing the time between these pixels and/or images, the number and magnitude of rainbow artifacts perceived from the system can be reduced.

FIGS. 5A-5E are signal flow diagrams illustrating methods of generating various complex colors in accordance with other embodiments of the present invention. As shown, the color white has been included in the color phase sequence to accommodate the case where a clear filter is included in a color wheel. As discussed herein, and indicated in FIGS. 5A-5E, the duration of the white color phase is shorter in time than the other color phases. In any event, as was the case with FIG. 4, the colors shown are not intended to be an exhaustive listing of possible complex colors that can be generated using the embodiments disclosed herein. Rather, selected complex colors have been presented as examples intended to broaden the scope of the present invention.

Figure 5:
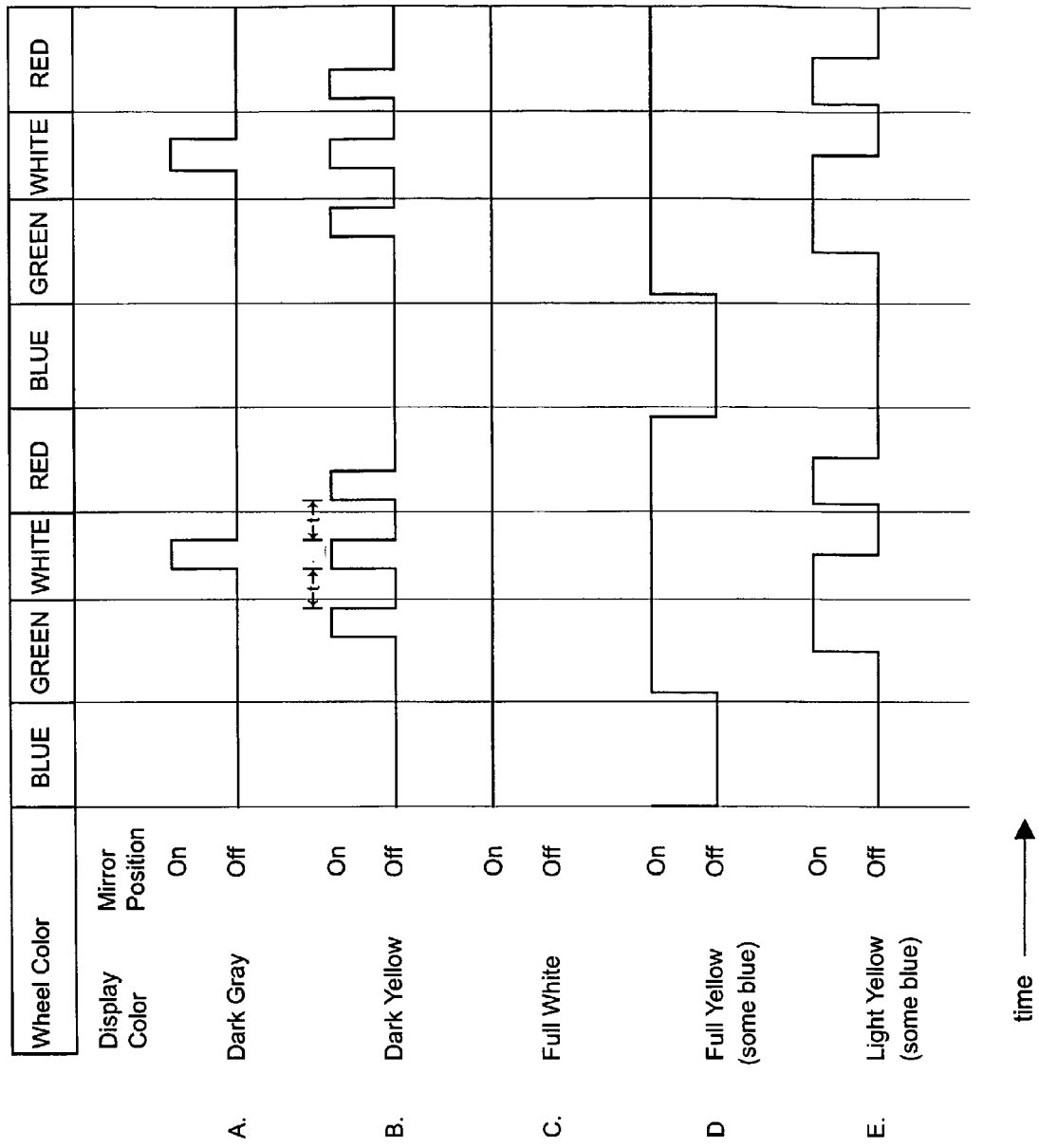
FIGS. 5A-5E are signal flow diagrams illustrating methods of generating various complex colors in accordance with other embodiments of the present invention.

FIG. 5A illustrates a method of producing a dark gray color in accordance with one embodiment of the present invention. The control signal causes the micromirror to be activated during the white color phase. Notably, the control signal switches to the on state during the white color phase. That is, the control signal need not go to the on state at the beginning of the white color phase.

FIG. 5B illustrates a method of producing a dark yellow color in accordance with the inventive arrangements disclosed herein. The dark yellow color can be produced from green, white, and red light. The control signal is placed in the on state approximately midway during the green color phase, i.e. at a midpoint portion. The signal returns to the on state during the white color phase at a midpoint portion. The control signal is again placed in the on state near or at the beginning of the red color phase. In this manner, i.e. by moving the pulse for the green color phase later in time, keeping the white pulse near the middle of the white color phase, and moving the pulse for the red color phase toward the beginning, the time "t" between respective on states is reduced and/or minimized.

FIG. 5C illustrates a method of producing a full white color in accordance with the inventive arrangements disclosed herein. The full white color can be produced by keeping the micromirror active during each of the respective color phases as shown. Because the clear section of the color wheel was used to generate all the color components simultaneously, this full-white color can be brighter than the full-white from a color wheel without a clear segment.

FIG. 5D illustrates a method of producing a full yellow color in accordance with the inventive arrangements disclosed herein. The full yellow color can be formed from green, white, and red light. Thus, as shown, the control signal has been placed in an on state during the entirety of each of the green, white, and red color phases. The control signal has been placed in an off state during the blue color phases.

FIG. 5E illustrates a method of producing a light yellow color in accordance with the inventive arrangements disclosed herein. The light yellow color can be formed of green, white, and red light. The control signal is placed in an on state at about midway through the green color phase, at a midpoint portion. The control signal remains on until about midway through the white color phase, at which point it is placed in an off state. The control signal is then returned to an on state at or about the beginning of the red color phase. By shifting the pulse for the green color phase back in time and keeping the pulses for both the white and red color phases at or near the beginning of each respective color phase, the amount of time between consecutive micromirror activations for different color phases is reduced and/or minimized. As noted, this can reduce perceivable rainbow artifacts within projection systems.

In order to maximize the effectiveness of the clear segment of the color wheel, the following technique can be used. First, for a given pixel color, the desired magnitudes of red, green, and blue are calculated. Next, the clear segment is used for a time period that is equivalent to the shortest activation time of the three color phases. If the shortest activation time of red, green, or blue is longer than the color phase of the clear segment, then the entire time of the color phase of the clear segment is used. The activation time for each of red, green, and blue is reduced by the amount of time that the clear color segment is activated. It should be appreciated, however, that other methods of using the clear segment of the color wheel can be used and that the present invention is not limited to the technique described above.

While foregoing is directed to the preferred embodiment of the present invention, other and further embodiments of the invention may be devised without departing from the basic scope thereof, and the scope thereof is determined by the claims that follow.

The invention claimed is:

1. A video projection system comprising:
   means for sequentially producing colored light from a light source, wherein each colored light is produced for a predetermined color phase;
   at least one digital micromirror device having a plurality of micromirrors, wherein at least one of said plurality of micromirrors is activated within each of two consecutive color phases beginning at about a midpoint of a first color phase of the two consecutive color phases, responsive to a control signal to reflect the colored light from said means for sequentially producing colored light, the two consecutive color phases comprised sequentially of a first color phase comprised of green color and a second color phase comprised of red color; and
   a lens configured to project light reflected from said at least one digital micromirror device onto a projection surface.

2. The video projection system of claim 1, wherein said at least one of said plurality of micromirrors generates at least one complex colored pixel.

3. The video projection system of claim 1, wherein the control signal activates said at least one of said plurality of micromirrors at about a middle location within said first of the two color phases.

4. The video projection system of claim 1, wherein the control signal activates said at least one of said plurality of micromirrors at about an end location within said first of the two color phases.

5. The video projection system of claim 1, wherein the control signal activates said at least one of said plurality of micromirrors at about a beginning location within said second of the two color phases.

6. The video projection system of claim 1, wherein the control signal activates said at least one of said plurality of micromirrors at about a middle location within said second of the two color phases.

7. The video projection system of claim 1, wherein the control signal causes said at least one of said plurality of micromirrors to remain on from a midpoint of the first of the two color phases into at least a portion of the second of the two color phases.

8. The video projection system of claim 1, further comprising a light source.

9. The video projection system of claim 1, wherein said means for sequentially producing colored light comprises a color wheel having blue, green, and red light filters.

10. The video projection system of claim 9, said color wheel further comprising a clear filter for producing white light.

11. The video projection system of claim 10, wherein white images generated using said clear filter are generated after blue images and before red images.

12. The video projection system of claim 10, wherein a white color phase generated using said clear filter is shorter in time than any other color phase.

13. The video projection system of claim 1, wherein said at least one micromirror device generates at least one complex image from sequentially ordered blue, green, and red images.

14. A video projection system comprising:
   means for producing blue, green, white, and red light from a light source, wherein each color is produced in sequential order for a predetermined color phase;
   at least one digital micromirror device reflecting the different colors of light, said digital micromirror device activated within each of two consecutive color phases beginning at about a midpoint of a first color phase of the two consecutive color phases, the two consecutive color phases comprised sequentially of a first color phase comprised of white light followed by a second color phase comprised of red light; and
   a lens configured to project the different colors of light onto a projection surface.

15. The video projection system of claim 14, wherein a color phase for white light is shorter than color phases for other colors.

16. The video projection system of claim 14, wherein a color phase for white light is disposed between blue and red light color phases.

17. A method of generating a complex color within a video projection system comprising:
   (a) generating different colors of light sequentially, each for a predetermined color phase; and
   (b) activating at least one micromirror within each of two consecutive color phases beginning at about a midpoint of a first color phase of the two consecutive color phases, the two consecutive color phases comprised sequentially of a first color phase comprised of green color followed by a second color phase comprised of red color thereby generating at least a portion of a complex colored picture.

18. The method of claim 17, wherein the midpoint location is located within a middle or an end of the first color phase.

19. The method of claim 17, further comprising repeating said step (b) for different ones of said micromirrors.

20. The method of claim 17, further comprising generating a complex image by generating constituent color images ordered as blue, green, and red.

21. The method of claim 20, further comprising generating a white image using a clear filter.

22. The method of claim 21, wherein the white image is generated between the blue and the red images.

* * * * *